United States Patent [19]

Yagasaki et al.

[11] Patent Number: 4,696,509
[45] Date of Patent: Sep. 29, 1987

[54] WINDSHIELD ADJUSTMENT DEVICE

[75] Inventors: Akio Yagasaki, Fuchu; Kazuo Marishima, Shiga, both of Japan

[73] Assignee: Honda Giken Kogyo KK, Tokyo, Japan

[21] Appl. No.: 895,539

[22] Filed: Aug. 13, 1986

Related U.S. Application Data

[63] Continuation of Ser. No. 756,114, Jul. 18, 1985, abandoned.

[30] Foreign Application Priority Data

Jul. 18, 1984 [JP] Japan .................................. 59-147599
Jul. 20, 1984 [JP] Japan ........................... 59-109624[U]

[51] Int. Cl.[4] ............................................. B62J 17/04
[52] U.S. Cl. .................................. 296/84 A; 296/78.1; 296/84 G; 296/84 N; 280/289 S
[58] Field of Search .................. 296/78 R, 78.1, 84 A, 296/84 S, 84 G, 84 N, 89; 49/420; 280/289 S

[56] References Cited

U.S. PATENT DOCUMENTS

| 1,974,894 | 9/1934 | Roethel | 49/420 |
| 2,160,099 | 5/1939 | Zeligman et al. | 296/89 |
| 3,134,112 | 5/1964 | Hage | 296/84 G |
| 3,369,836 | 2/1968 | Haycock et al. | 296/78.1 |
| 4,353,590 | 10/1982 | Wei-Chuan | 296/78.1 |
| 4,479,663 | 10/1984 | Morris et al. | 296/78.1 |
| 4,606,571 | 8/1986 | Fujita | 296/78.1 X |

FOREIGN PATENT DOCUMENTS

| 455569 | 8/1913 | France | 296/84 |
| 208276 | 1/1940 | Switzerland | 296/78.1 |
| 346779 | 7/1960 | Switzerland | 296/78.1 |
| 766457 | 1/1957 | United Kingdom | 296/78.1 |

Primary Examiner—Dennis H. Pedder
Attorney, Agent, or Firm—Pollock, Vande Sande & Priddy

[57] ABSTRACT

Device for adjusting the height as well as the angle of rearward tilt of the windshield of a two-wheeled vehicle, comprising a guide mechanism consisting of generally vertical grooves having a curvature or inclination. Side edges of the windshield engage in these grooves, so that upward or downward movement of the windshield simultaneously produces a change in the angle of tilt, thereby facilitating adjustment of the windshield to the stature and/or position of the rider of the vehicle.

3 Claims, 12 Drawing Figures

WINDSHIELD ADJUSTMENT DEVICE

This application is a continuation of application Ser. No. 756,114, filed July 18, 1985, now abandoned.

FIELD OF THE INVENTION

The present invention relates to a device for adjusting the windshield of a vehicle, particularly a two-wheeled vehicle such as a motorcycle.

BACKGROUND OF THE INVENTION

It is known in the art to adjust the windshields of two-wheeled vehicles, for example, by bolting the windshields through slotted holes therein which enable vertical movement upon loosening of the bolts. This present various disadvantages. In the first place, loosening and tightening of the bolts in a cumbersome procedure. In the second place, bolts and slotted holes must be provided on the bottom edge and both lateral edges of the windshield in order to prevent its excessive vibration and subsequent loosening. Finally, molding or other means must be provided to camouflage the attachment means.

Furthermore, while the prior art devices permit adjustment in the height of the windshield, they do not permit adjustment of the distance between the windshield and the rider of the vehicle. This means that, depending on the stature of the rider, the windshield is likely to be either too close, or too distant to shield him effectively from the wind. When raised to its uppermost position, it also greatly increases wind resistance, with negative effects on fuel economy.

OBJECT OF THE INVENTION

It is an object of the invention to overcome these disadvantages, by providing the windshield with a guide mechanism, so that, as it is raised or lowered, its fore-aft tilt changes.

SUMMARY OF THE INVENTION

The guide mechanism according to the invention operates by means of guide grooves in the frame supporting the windshield, whereby, when the height of the windshield is adjusted, the angle of rearward tilt is increased, so that an optimal distance is maintained between the rider and the windshield. The guide grooves may be provided in the housing for the left and right rear view mirrors, so that the windshield is free to slide in these grooves while engaged in them.

BRIEF DESCRIPTION OF THE DRAWINGS

In order that the invention may be more clearly understood, reference will now be made to the accompanying drawings, wherein several embodiments of the invention are shown for purposes of illustration, and wherein.

DETAILED DESCRIPTION

Figure 1:
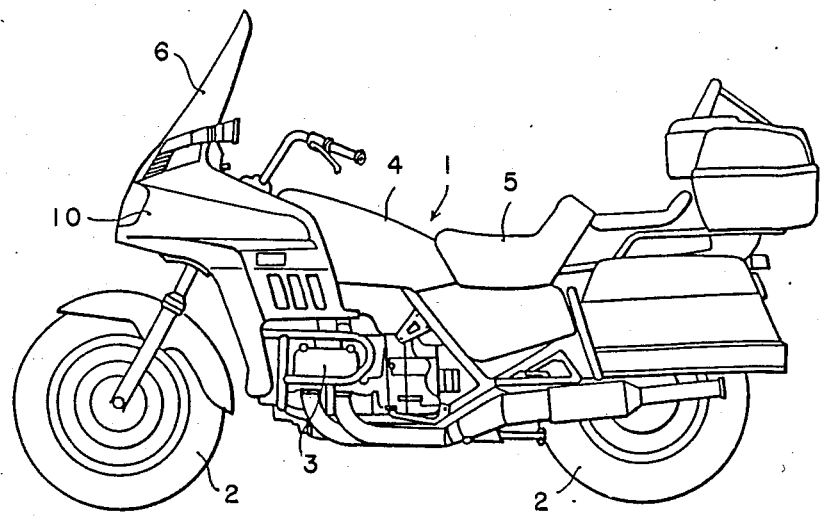
FIG. 1 is a side view of a motorcycle equipped with a windshield adjustment device according to the invention.

FIG. 1 shows a motorcycle having a frame 1 equipped with wheels 2 at the front and rear. An engine 3 is mounted at the center of the frame, with a fuel tank 4 above it and a seat 5 to the rear of the fuel tank. A windshield 6, mounted at the front of the frame, is adjustable by up-and-down movement to correspond to the stature and/or position of the rider.

Figure 2:
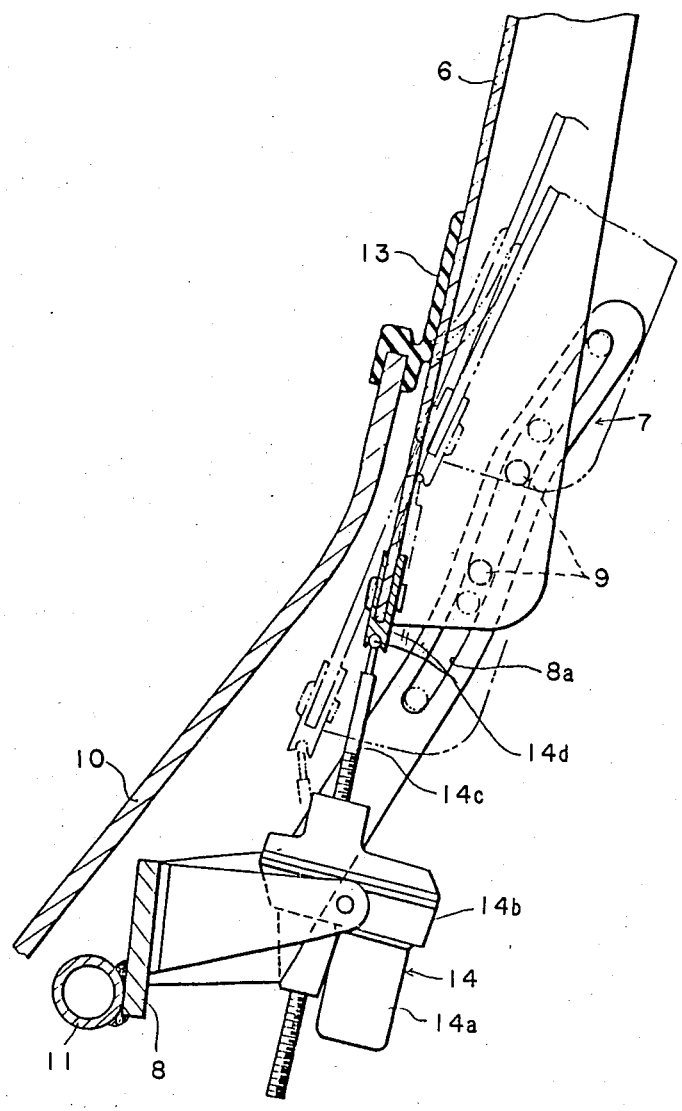
FIG. 2 is a side view, partly in cross section, showing details of the attachment of the device.
Figure 3:
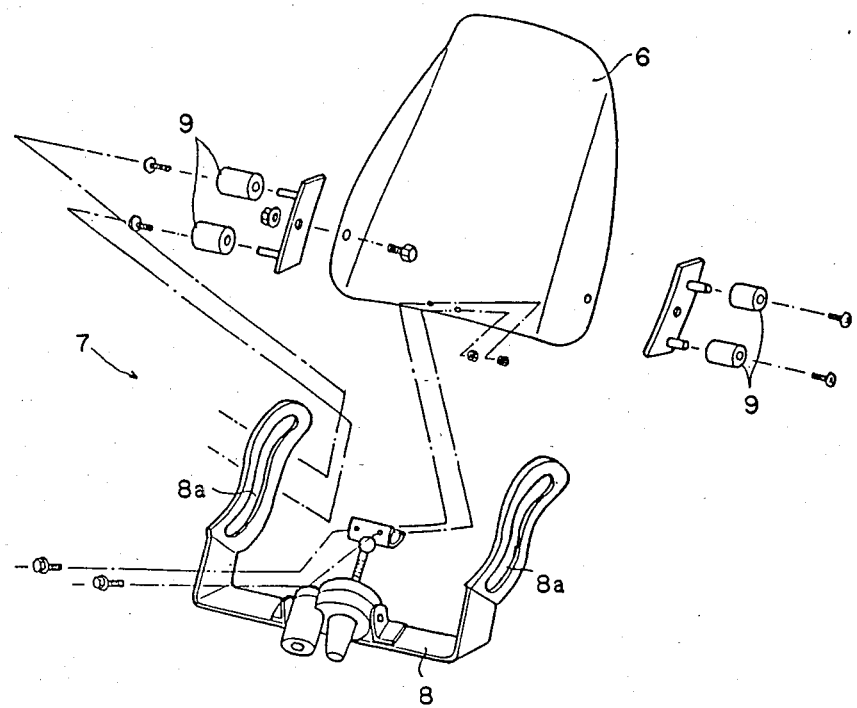
FIG. 3 is an exploded perspective view of the attachment elements of the device.

As shown in FIGS. 2 and 3, a guide mechanism 7 supports the windshield 6 on the frame 1 in such manner as to allow the windshield to tilt fore and aft as it is raised or lowered. It is composed of a stay 8 having two sections which are bent to form a substantially U shape. A guide groove 8a in each stay section is so located that the tilt angle toward the rear increases in the upward direction. Both sides of windshield 6 are attached by shafts to guide rollers 9 which fit into and slide along grooves 8a, so that windshield 6 is supported on frame 1 via stay sections.

Stay sections 8 may be attached to frame 1 by means of a bracket, but in the embodiment shown in FIG. 2, they are welded to an attachment shaft 11 extending traversely to the front portion of the frame. A rubber seal 13 extends along the edge of windshield 6 where it meets front portion 10 of the frame.

Adjustment of the windshield position can be accomplished electrically, e.g., by use of a drive source 14 comprising a motor 14a with a gear box 14b which causes a push rod 14c to move up and down. Stay sections 8 are pivotally connected to drive source 14 by a ball joint 14d on the lower edge of windshield 6, which can thus be moved up and down by drive source 14.

During high speed driving, when the rider leans forward, the height of the windshield can be adjusted for this posture in order to cut down undesirable wind resistance. Such resistance is further reduced because the orientation of grooves 8a causes the angle of tilt to increase near the bottom travel area of the windshield, as illustrated in FIG. 4c.

Figures 4A, 4B:
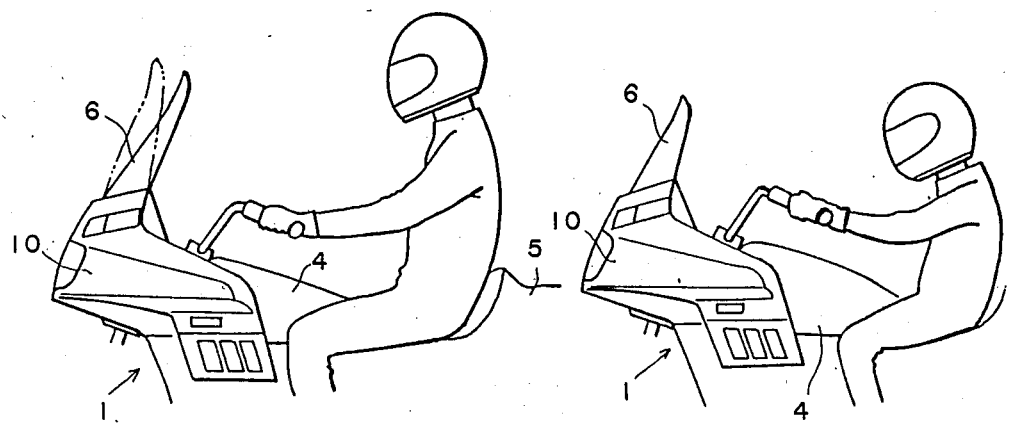
FIGS. 4a, 4b and 4c are perspective views showing various positions of the windshield, adjusted for the stature and position of the rider.
Figure 4C:
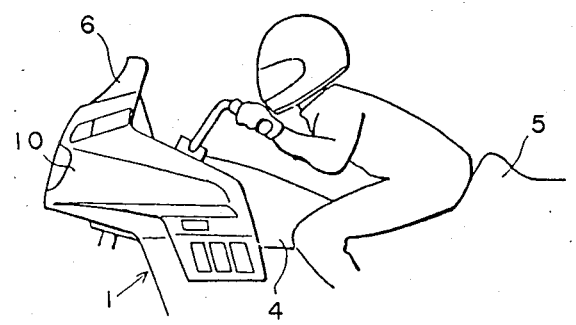
Figure 5:
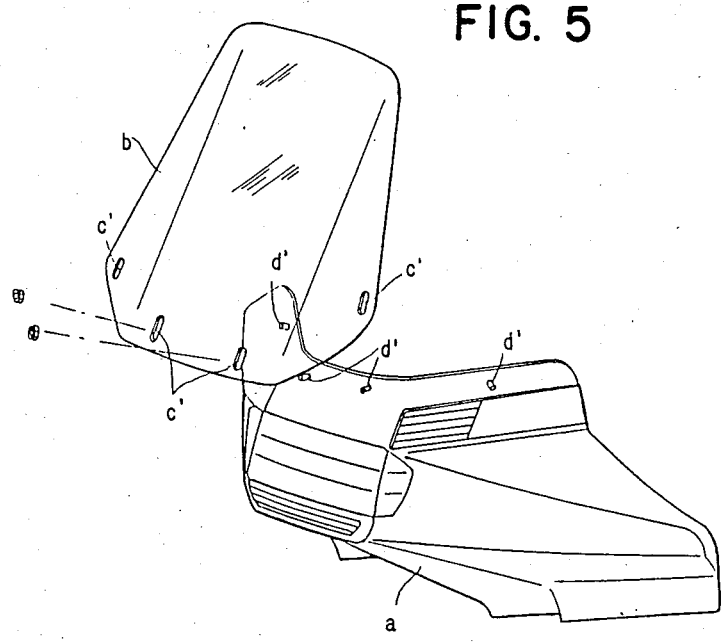
FIG. 5 is a perspective view showing the attachment of a height adjustable windshield according to the prior art.

FIGS. 4a and 4b show large and small sized riders, respectively, and the correspondingly adjusted positions of windshield 6. When the windshield is raised to accommodate a rider having long arms and legs, the rider position is generally farther back on seat 5. In prior art devices, the height of the windshield could be changed (as shown in dot-dash lines in FIG. 4a), but the wind would get around the windshield because of the large distance between it and the rider. The provision for changing rearward tilt according to the present invention overcomes this problem.

A second embodiment of the invention is shown in FIGS. 6 to 10. In this embodiment, left and right rear view mirrors 18 are carried in housings 19 each provided with a guide groove 20 in which both side edges of windshield 6 slidably engage.

Figure 6:
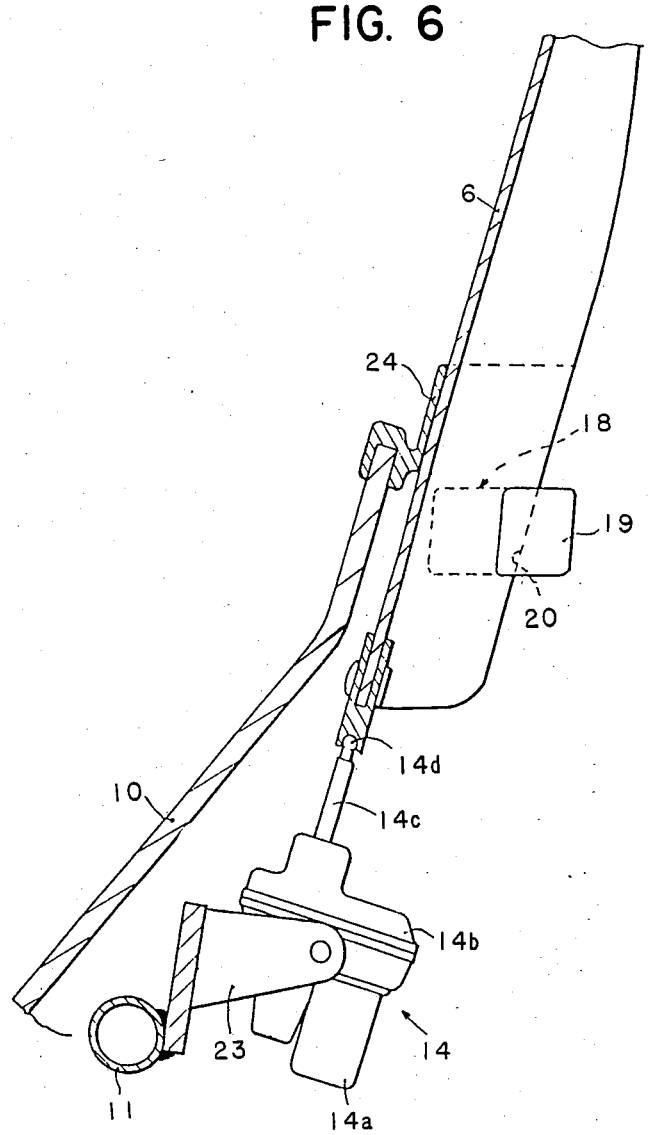
FIG. 6 is a side view, similar to FIG. 2, showing a second embodiment of the attachment of the device.
Figure 7:
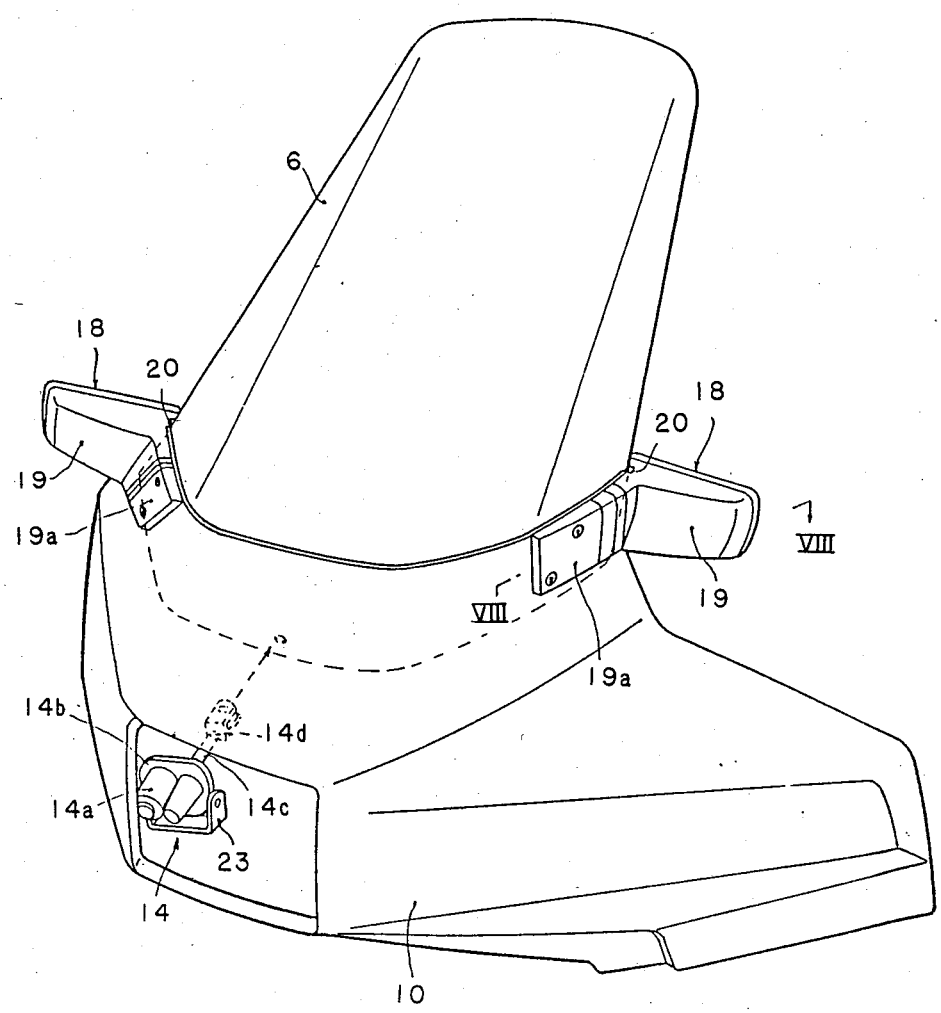
FIG. 7 is a detail perspective view, seen from the front of the vehicle, of the device shown in FIG. 6.
Figure 8:
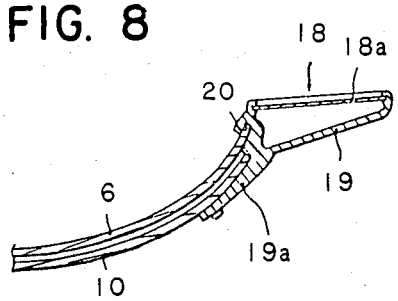
FIG. 8 is a cross section view along line VIII—VIII in FIG. 7.

As shown in FIGS. 6 to 8, each mirror assembly 18 consists of a mirror 18a within housing 19 with an attachment extension 19a by the inside of which housing 19 is attached to the upper edge of fairing 10 by means of a retaining element.

Figure 10:
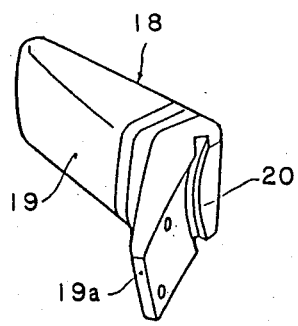
FIG. 10 is a perspective view of the rear view mirror.
Figure 9:
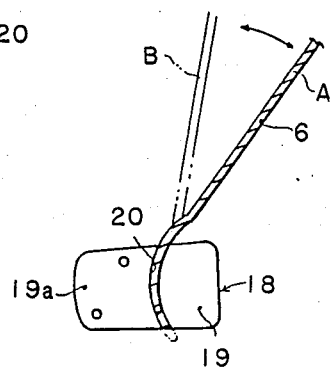
FIG. 9 is a perspective view, partly in section, of a further embodiment.

As shown in FIG. 6, grooves 20 permit up-and-down adjustment of the height of windshield 6 with respect to frame 1. By giving the grooves a curvature, as shown in FIGS. 9 and 10, the windshield can be tilted rearwardly in order to adjust it. If the grooves are given a greater curvature, it is possible to adjust both the height and the rearward tilt of the windshield. If it is moved upwardly, as indicated by arrow A in FIG. 9, it tilts rearwardly at the same time; if it is moved downwardly, as indicated by arrow B, the angle of tilt decreases.

The drive means for this second embodiment are generally similar to those already described with respect to to the first embodiment. A rubber seal 24 similar to seal 13 is also provided.

What is claimed is:

1. Device for adjusting the windshield of a vehicle comprising left and right rear view mirrors attached to a frame, each of said mirrors having a mirror housing provided with generally vertically extending curved guide groove means engaged by side edges of said windshield, edges of said windshield operatively engaging in said guide groove means for generally vertical up-and-down sliding movement simultaneously producing a change in the angle of tilt of said windshield.

2. Device according to claim 1, wherein said guide grooves have a curvature to permit adjustment of the rearward tilt of said windshield.

3. Device according to claim 1, comprising drive means for electrically adjusting the position of said windshield.

* * * * *